United States Patent
Fennel et al.

(10) Patent No.: US 7,920,981 B2
(45) Date of Patent: Apr. 5, 2011

(54) METHOD OF CALIBRATING A SENSOR, IN PARTICULAR A YAW RATE SENSOR

(75) Inventors: Helmut Fennel, Bad Soden (DE); Ralf Herbst, Nastatten (DE); Rainer Kitz, Nidderau (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 385 days.

(21) Appl. No.: 12/088,711

(22) PCT Filed: Sep. 1, 2006

(86) PCT No.: PCT/EP2006/065931
§ 371 (c)(1),
(2), (4) Date: Mar. 31, 2008

(87) PCT Pub. No.: WO2007/026022
PCT Pub. Date: Mar. 8, 2007

(65) Prior Publication Data
US 2009/0248346 A1  Oct. 1, 2009

(30) Foreign Application Priority Data

Sep. 2, 2005 (DE) .......................... 10 2005 042 059
Sep. 1, 2006 (DE) .......................... 10 2006 041 289

(51) Int. Cl.
*G01P 21/00* (2006.01)
*G06F 7/00* (2006.01)

(52) U.S. Cl. ............................................. 702/94; 701/29
(58) Field of Classification Search ................... 702/94, 702/96; 701/29, 75
See application file for complete search history.

(56) References Cited

U.S. PATENT DOCUMENTS

| 4,611,304 | A |   | 9/1986 | Butenko et al. |
|---|---|---|---|---|
| 4,675,820 | A |   | 6/1987 | Smith et al. |
| 5,038,306 | A | * | 8/1991 | Kellett .......................... 702/105 |
| 5,527,003 | A |   | 6/1996 | Diesel |
| 6,175,807 | B1 |   | 1/2001 | Buchler et al. |
| 6,400,044 | B1 |   | 6/2002 | Lohberg et al. |
| 6,577,952 | B2 |   | 6/2003 | Geier et al. |
| 2003/0109939 | A1 | * | 6/2003 | Burgdorf et al. ................. 700/38 |

FOREIGN PATENT DOCUMENTS

DE  4228893  3/1994

* cited by examiner

*Primary Examiner* — Bryan Bui

(57) ABSTRACT

The invention relates to a method of calibrating a sensor, in particular a yaw rate sensor, in which sensor values ($Y_{sensor}$) and associated temperature values (T) are stored in the shape of reference points in a non-volatile memory of the sensor, in which case the values ($Y_{sensor}$, T) are determined during a calibration mode in which the sensor is exposed to a predefined temperature profile. In order to further improve the accuracy of the calibration, the invention discloses that the values ($Y_{sensor}$, T) determined in the calibration mode are used to determine coefficients ($C_0, \ldots, C_{n-1}, C_n$) of a polynomial of nth order, and these coefficients are stored.

7 Claims, 4 Drawing Sheets

METHOD OF CALIBRATING A SENSOR, IN PARTICULAR A YAW RATE SENSOR

BACKGROUND OF THE INVENTION

The present invention relates to a method of calibrating a sensor, in particular a yaw rate sensor, in which sensor values and associated temperature values (T) are stored in the shape of reference points in a non-volatile memory of the sensor, in which case the values are determined during a calibration mode in which the sensor is exposed to a predefined temperature profile, and relates to a sensor.

So-called sensor clusters are employed in many cases in motor vehicles with ESP functionality, which contain yaw rate sensors being connected to a separate electronic brake control unit (EBS) via a data bus. A sensor cluster consists of screened housing, yaw rate sensor elements, an electronic processing unit (e.g. microcontroller) and a data bus such as a CAN bus (WO 00/32022).

The sensor cluster makes use of at least one yaw rate sensor, the zero offset error thereof depending on manufacturing tolerance, temperature and ageing. During operation of the sensor, this zero point is responsible for possible inaccuracies of the yaw rate sensor in dependence on temperature.

The yaw rate sensor is calibrated within limits during its manufacture and during its operation with respect to its zero offset error.

FIG. 1 shows the signal processing within the sensor cluster, which is described in WO 01/50090 A1.

During manufacture the sensor cluster is switched into a special calibration mode. Subsequently, the sensor cluster runs through a fixed temperature range in a furnace. As this occurs, the software in the sensor cluster senses the temperature and the zero point of the yaw rate sensor.

The reference points $[T, Y_{Offset}]$ are determined from the read-in data and are saved in the non-volatile memory. The calibration mode is left thereafter.

Thus, n-correction positions $[T_n, Y_{Offset}(n)]$ are available for the zero point correction of the yaw rate sensor.

During operation of the vehicle, the temperature of the sensor module is constantly measured, and based on this value the zero offset error of the yaw rate sensor is calculated using the stored reference points by way of linear interpolation.

The yaw rate signal sent by way of the CAN bus is calculated from the measured sensor signal and the calculated zero point of the yaw rate sensor according to the following relation:

$$Y_{cluster} = Y_{Sensor} - Y_{Offset}$$

When vehicle standstill is detected, the temperature of the sensor module and the yaw rate are measured. These values are allocated to one of the temperature classes stored in a non-volatile memory. A suitable method is used to determine the average value of the already saved zero point of the yaw rate sensor and the newly measured value. The result is stored in the non-volatile memory instead of the old value.

This calibration still does not provide a sufficient rate of accuracy for some special service requirements; hence, there is the demand of further improving the zero offset error.

In view of the above, an object of the invention is to still further improve the accuracy of the calibration of the sensor error.

SUMMARY OF THE INVENTION

The invention achieves this object in that a generic method for calibration of a sensor, in particular a yaw rate sensor, in which sensor values and associated temperature values are stored in the shape of reference points in a non-volatile memory of the sensor, in which case the values are determined during a calibration mode in which the sensor is exposed to a predefined temperature profile, is implemented in such a manner that the values determined in the calibration mode are used to determine coefficients of a polynomial of nth order, and these coefficients are stored.

Polynomial interpolations are e.g. known from www-.mathe-online.at.

The method of calibrating the zero point of an inexact yaw rate sensor, which compensates the still existing zero offset error depending on the temperature by means of a polynomial of nth order and thereby achieves an improvement in terms of accuracy, also renders it possible to compensate the component of the zero offset error of the yaw rate sensor that is due to ageing.

Favorably, the method performs an adaptation of the coefficients found during the service life of the sensor cluster, what improves the calibration still more.

The method arranges to determine coefficients of a polynomial of nth order by making the sensor cluster pass through a fixed temperature range in a furnace during the manufacture. As this occurs, the software in the sensor cluster senses the temperature and the zero point of the yaw rate sensor. The sensor cluster determines from the measured values the coefficients of the polynomial and stores these coefficients in the non-volatile memory.

During operation of the sensor cluster, the temperature T of the sensor module is sensed and the zero point of the yaw rate is corrected using the polynomial of nth order and the stored coefficients.

Advantageously, a polynomial of nth order is used to calculate a compensation value $Y_{Offset}$ by means of the determined and stored coefficients during the operation of the sensor in the motor vehicle, that means during defined operating states of the motor vehicle.

Preferably, an error-corrected sensor value $Y_{Cluster}$ is determined by means of the compensation value $Y_{Offset}$ and the measured sensor value during operation of the sensor in the motor vehicle.

In this case, the first coefficients are calculated during the calibration mode, while the first error-corrected sensor values are determined during operation of the sensor in the motor vehicle. In the further course of action, the calculated error-corrected sensor values $Y_{Cluster}$ and associated temperature values are favorably determined for calculation of the coefficients of the polynomial of nth order during the operation of the sensor in the motor vehicle, with these coefficients being stored.

In a calibration method of the invention, the determined and stored coefficients are used to calculate a compensation value $Y_{Offset}$ preferably by means of a polynomial of third order during the operation of the sensor in the motor vehicle, and this compensation value is logically operated with the measured sensor value in such a way that, according to the relation $Y_{Cluster} = Y_{Sensor} - Y_{offset}$, the error-corrected sensor value is obtained which can be sent to a vehicle controller. Preferred vehicle controllers are driving stability controllers such as ESP, ARP, ABS or occupant protection control systems.

A method runs in a vehicle controller for driving stability control and/or occupant protection control when a sensor, in particular a yaw rate sensor, is provided. Favorably, the sensor is at least characterized by:

- a sensor element,
- a signal processing unit,
- a data bus,
- a non-volatile data memory,
- means for mode change-over with at least one calibration mode and one operating mode,
- a temperature sensor and/or means for reading in temperature information, in particular by way of the data bus, and
- an appropriate algorithm which produces the coefficients of a polynomial of nth order based on stored sensor values and associated temperature values.

The sensor cluster is preferred to consist of a microcontroller (processing unit) and a non-volatile memory, and depending on the design, of a defined number of yaw rate sensors and acceleration sensors and a signal-conditioning stage.

According to the method, the sensor data is preferred to be read in by a processing unit and to be output thereafter to the vehicle controllers using a bus interface.

Preferably, the sensor cluster can be extended by at least one temperature sensor for the possibility of calibrating the zero point as explained in this invention.

Further preferred embodiments can be seen in the subsequent description of an embodiment making reference to the Figures that follow.

DETAILED DESCRIPTION OF THE DRAWINGS

Figure 1:
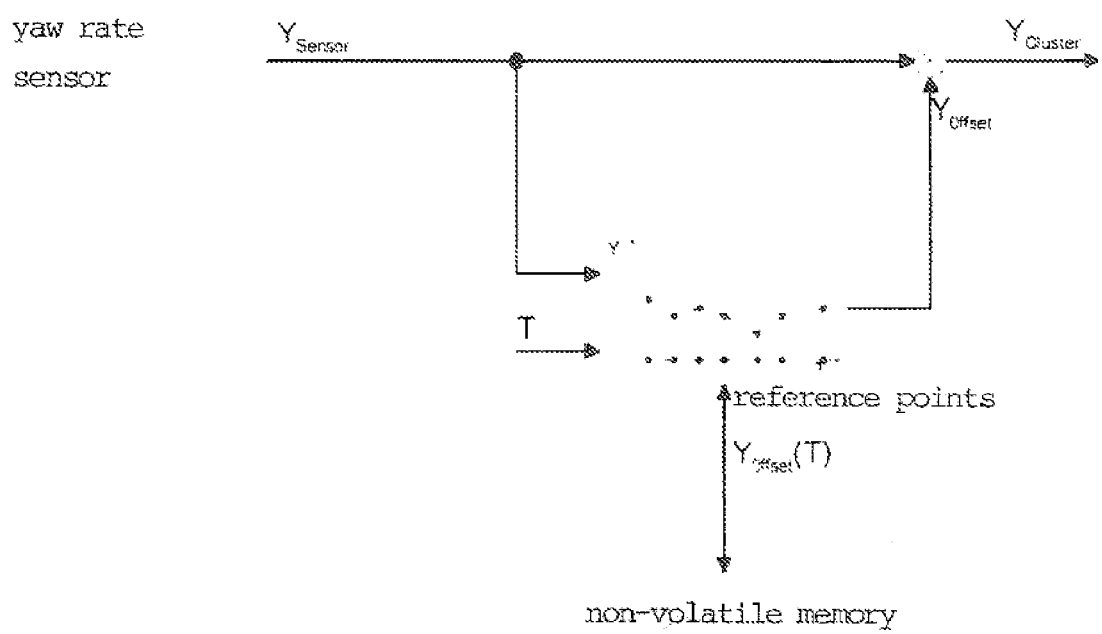
FIG. 1 is a schematic representation of determining a compensation value according to the prior art.
Figure 2:
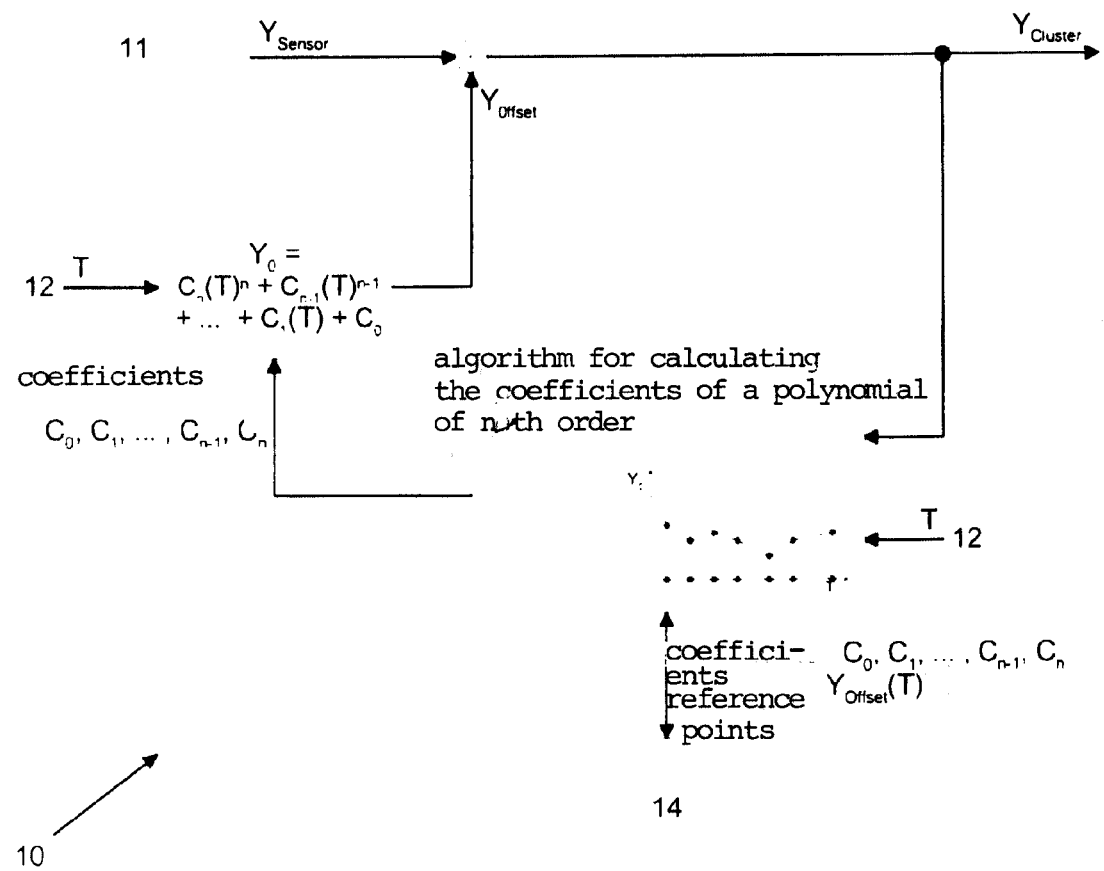
FIG. 2 is a schematic representation of determining a compensation value according to the invention.

FIG. 2 illustrates the signal processing unit 10 within the sensor cluster. The zero point of the yaw rate sensor 11 depends on the temperature T of the sensor module. A temperature sensor 12 as disclosed in document DE 42 28 893 B4, for example, is provided within the sensor cluster for measuring the temperature.

The sensor cluster is switched into a special calibration mode during manufacture. Subsequently, the sensor cluster passes through a fixed temperature range in a furnace. As this occurs, the sensor cluster software senses the temperature and the zero point of the yaw rate sensor. The read-in data is grouped and stored in the non-volatile memory 14. Further, the coefficients $C_0, \ldots, C_{n-1}, C_n$ of a polynomial of nth order are determined from the sensed values using an appropriate algorithm and are likewise stored in the non-volatile memory 14. Subsequently, the special calibration mode is left.

Figure 3:
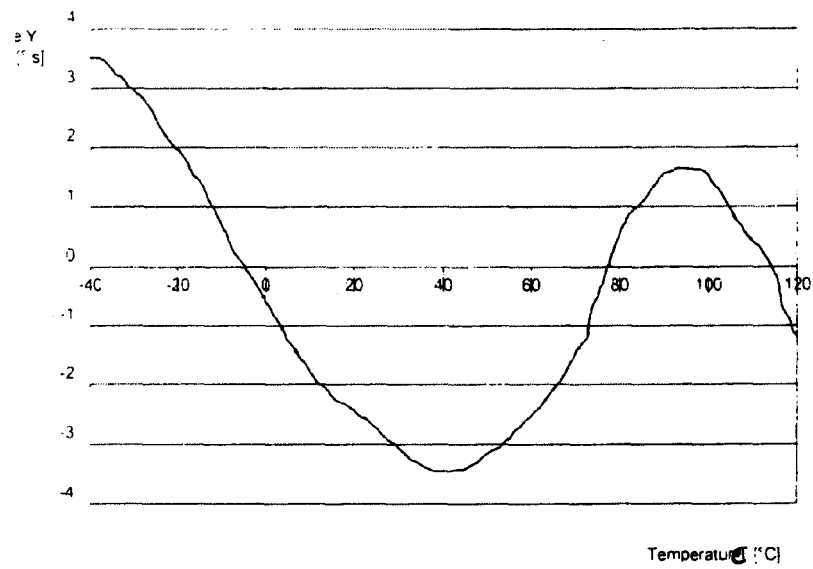
FIG. 3 shows an exemplary curve of a yaw rate as a function of the temperature.

FIG. 3 shows as an example a curve of the yaw rate as a function of the temperature which can be plotted in a first operating mode, i.e. during a calibration measurement. During the calibration mode, the curve of the yaw rate as a function of the temperature is split up in the shape of reference points with n points (n=number of the calibration points), and these points are stored.

Figure 4:
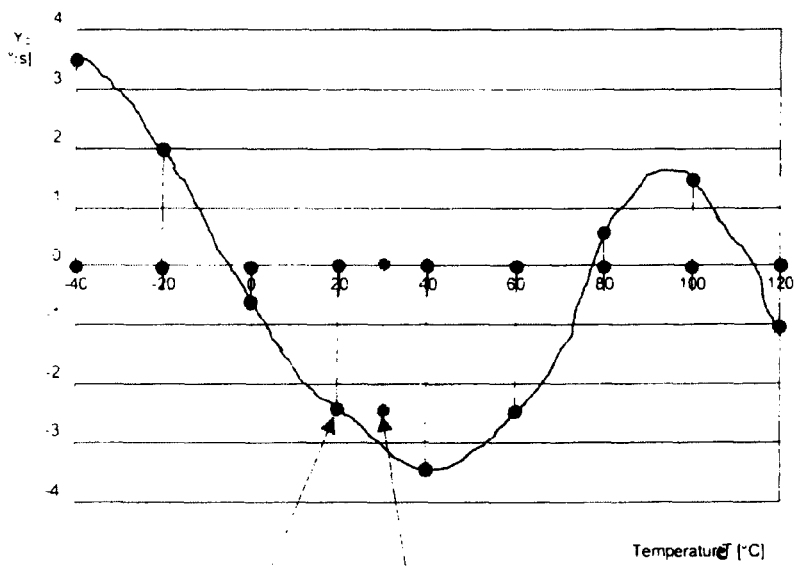
FIG. 4 shows a number of n-points (reference points) [T, $Y_0$], which are used for the zero point calibration of the yaw rate sensor.

FIG. 4 shows a number of n points (reference points) [T, $Y_0$] which are taken into account for the zero point calibration of the yaw rate sensor.

In the second operating mode, i.e. during operation of the sensor in the motor vehicle, the temperature and the zero point of the yaw rate sensor are measured when vehicle standstill is detected and are stored intermediately as a new point (reference point) (FIG. 4). Based on the reference points which have been stored in the non-volatile memory 14 during the manufacture and based on the new point, the coefficients for a polynomial of third order are now re-calculated using an appropriate algorithm. These re-calculated coefficients are stored in the non-volatile memory 14 of the sensor cluster and substitute the values which have been valid up to this point of time.

A primary vehicle controller, preferably the driving dynamics controller, sends the information about a reliably detected vehicle standstill to the sensor cluster.

Figure 5:
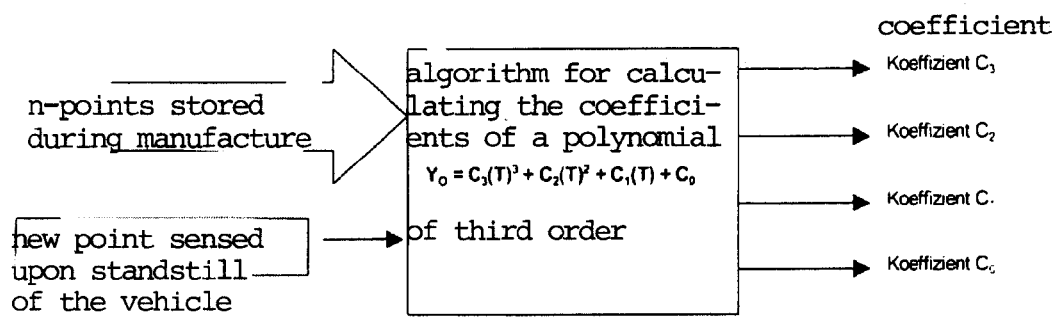
FIG. 5 is a schematic representation of calculating the new zero point.

The polynomial $$Y_o = Cn(T)^n + C_{n-1}(T)^{n-1} + \ldots + C_1(T) + C_0$$

which is illustrated in the box of FIG. 5 as an example of a polynomial of third order is used to calculate the new zero point.

The yaw rate signal sent via the CAN interface is also calculated from the sensor signal and the re-calculated zero point according to the following formula $$Y_{cluster} = Y_{Sensor} - Y_{Offset}$$

The invention claimed is:

1. A method of calibrating a sensor, the method comprising:

performing a calibration mode in which the sensor is exposed to a predefined temperature profile;

determining sensor values and associated temperature values during the calibration mode; and storing the sensor values ($Y_{sensor}$) and associated temperature values (T) in a non-volatile memory of the sensor;

using the sensor values ($Y_{sensor}$, T) determined in the calibration mode to determine coefficients ($C_0, \ldots, C_{n-1}, C_n$) of a polynomial of nth order; and storing the coefficients, wherein the determined and stored coefficients ($C_0, \ldots, C_{n-1}, C_n$) are used to calculate a compensation value $Y_{Offset}$ b means of a polynomial of at least third order during operation of the sensor.

2. The method of claim 1, wherein a compensation value $Y_{Offset}$ is calculated using a polynomial of nth order by means of the determined and stored coefficients ($C_0, \ldots, C_{n-1}, C_n$) during operation of the sensor.

3. The method of claim 2, wherein an error-corrected sensor value $Y_{Cluster}$ is determined by means of the compensation value $Y_{Offset}$ and the measured sensor value during operation of the sensor.

4. The method of claim 1, wherein error-corrected sensor values $Y_{Cluster}$ and associated temperature values T are determined for calculation of the coefficients of the polynomial of nth order during the operation of the sensor.

5. The method of claim 1, wherein the sensor is a yaw rate sensor.

6. The method of claim 5, wherein the sensor is provided in a vehicle.

7. A sensor comprising:
- a sensor element (11);
- an electronic processing unit (10);
- a data bus;
- means for mode change-over with at least one calibration mode and one operating mode;
- a temperature sensor (12);
- a non-volatile memory (14), wherein the non-volatile memory stores sensor values from the sensor element (11) and associated temperature values from the temperature sensor; and
- an algorithm which produces coefficients of a polynomial of nth order based on the stored sensor values and associated temperature values, wherein the determined and stored coefficients ($C_0, \ldots, C_{n-1}, C_n$) are used to calculate a compensation value $Y_{Offset}$ by means of a polynomial of at least third order during operation of the sensor.

* * * * *